US012559125B2

(12) United States Patent
Jerg et al.

(10) Patent No.: US 12,559,125 B2
(45) Date of Patent: Feb. 24, 2026

(54) METHOD FOR THE ANIMATED REPRESENTATION OF AN OBJECT PERCEPTION AND OF A DRIVING INTENTION OF AN ASSISTANCE SYSTEM OF A VEHICLE, ASSISTANCE SYSTEM, COMPUTER PROGRAM, AND COMPUTER-READABLE (STORAGE) MEDIUM

(71) Applicant: Bayerische Motoren Werke Aktiengesellschaft, Munich (DE)

(72) Inventors: Stefan Jerg, Kranzberg (DE); Christoph Mayser, Unterhaching (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 11 days.

(21) Appl. No.: 18/720,230

(22) PCT Filed: Nov. 10, 2022

(86) PCT No.: PCT/EP2022/081514
§ 371 (c)(1),
(2) Date: Jun. 14, 2024

(87) PCT Pub. No.: WO2023/110238
PCT Pub. Date: Jun. 22, 2023

(65) Prior Publication Data
US 2025/0042425 A1 Feb. 6, 2025

(30) Foreign Application Priority Data
Dec. 15, 2021 (DE) ..................... 10 2021 133 174.9

(51) Int. Cl.
*B60W 50/14* (2020.01)
*B60K 35/22* (2024.01)
(Continued)

(52) U.S. Cl.
CPC ............. *B60W 50/14* (2013.01); *B60K 35/22* (2024.01); *B60K 35/28* (2024.01); *B60K 35/29* (2024.01);
(Continued)

(58) Field of Classification Search
CPC .......... B60W 50/14; B60W 2050/146; B60W 2555/60; B60K 35/22; B60K 35/28;
(Continued)

(56) References Cited

U.S. PATENT DOCUMENTS 11,697,345 B2 * 7/2023 Yao ........................... G06T 3/20
345/156
2010/0253600 A1 * 10/2010 Seder ................ B32B 17/10036
345/7
(Continued)

FOREIGN PATENT DOCUMENTS

DE 10 2011 121 948 A1 6/2013
DE 10 2012 015 002 B4 9/2016
(Continued)

OTHER PUBLICATIONS

International Search Report (PCT/ISA/210) issued in PCT Application No. PCT/EP2022/081514 dated Feb. 2, 2023 with English translation (5 pages).
(Continued)

*Primary Examiner* — Andrew W Bee
(74) *Attorney, Agent, or Firm* — Crowell & Moring LLP

(57) ABSTRACT
Systems, methods, and apparatuses are provided for animated representation of at least one object perception and of a driving intention of an assistance system for at least partially automated maneuvering of a vehicle. An object is perceived within an environment of the vehicle using the assistance system. The perceived object influences a control strategy of the at least partially automated maneuvering of
(Continued)

the assistance system. The perceived object is represented. The vehicle is represented by an avatar. A first animation is displayed of an interaction between the avatar and the perceived object. The avatar is animated to mimic a first action based on the perceived object. A second animation is displayed representing the driving intention of the assistance system. The avatar is animated to mimic a second action based on a plan of the control strategy influenced by the perceived object.

10 Claims, 3 Drawing Sheets

(51) Int. Cl.
*B60K 35/28* (2024.01)
*B60K 35/29* (2024.01)

(52) U.S. Cl.
CPC .. *B60K 2360/165* (2024.01); *B60K 2360/178* (2024.01); *B60K 2360/1868* (2024.01); *B60W 2050/146* (2013.01); *B60W 2555/60* (2020.02)

(58) Field of Classification Search
CPC .............. B60K 35/29; B60K 2360/165; B60K 2360/178; B60K 2360/1868
See application file for complete search history.

(56) References Cited

U.S. PATENT DOCUMENTS

| | | | |
|---|---|---|---|
| 2013/0179023 A1 | 7/2013 | Schmidt | |
| 2019/0144004 A1* | 5/2019 | Mimura | B60W 30/16 |
| | | | 701/28 |
| 2019/0310627 A1* | 10/2019 | Halder | G05D 1/0033 |
| 2020/0117187 A1* | 4/2020 | Kothari | G07C 9/00563 |
| 2021/0356966 A1* | 11/2021 | Nix | G05D 1/0088 |
| 2022/0169274 A1* | 6/2022 | Seitz | B60W 30/0956 |
| 2023/0058508 A1* | 2/2023 | Bush | B60K 35/25 |

FOREIGN PATENT DOCUMENTS

| | | | |
|---|---|---|---|
| DE | 10 2015 223 248 A1 | 5/2017 | |
| DE | 10 2018 121 274 A1 | 3/2020 | |
| DE | 10 2018 121 274 B4 | 7/2020 | |
| DE | 10 2020 106 380 A1 | 9/2021 | |
| GB | 2588983 A * | 5/2021 | ........ B60W 60/0013 |

OTHER PUBLICATIONS

German-language Written Opinion (PCT/ISA/237) issued in PCT Application No. PCT/EP2022/081514 dated Feb. 2, 2023 with English translation (8 pages).
German-language Search Report issued in German Application No. 10 2021 133 174.9 dated Aug. 25, 2022 with partial English translation (12 pages).

* cited by examiner

METHOD FOR THE ANIMATED REPRESENTATION OF AN OBJECT PERCEPTION AND OF A DRIVING INTENTION OF AN ASSISTANCE SYSTEM OF A VEHICLE, ASSISTANCE SYSTEM, COMPUTER PROGRAM, AND COMPUTER-READABLE (STORAGE) MEDIUM

BACKGROUND AND SUMMARY

The present subject matter relates to a method for animated representation of at least one object perception and of a driving intention of an assistance system of a vehicle. Over and above this, the present subject matter relates to an assistance system for a vehicle. Lastly, the present subject matter relates to a computer program and a non-transitory computer-readable storage medium.

Diverse driver-assistance systems are known from the prior art which assist a driver in maneuvering the vehicle. For instance, adaptive cruise control systems, (ACC for short), lane-change assistance systems and further assistance systems for at least partially automated maneuvering of the vehicle are known. Such assistance systems ordinarily include a plurality of ambient-field sensors with which objects in the environment of the vehicle can be detected. Depending on the detected objects in the environment of the vehicle, a maneuver that is at least partially automated can be planned by the assistance system. The objects detected in the environment can influence the control strategy of the assistance system during the at least partially automated maneuvering.

Although the maneuvering, or the controlling in respect of the objects detected in the environment, takes place at least in partially automated manner, currently the driver of the vehicle usually bears the responsibility for an assistance system operating in compliance with the rules and correctly. Consequently it is imperative that the driver of the vehicle has a good understanding of the system at all times, regardless of the current traffic situation. It is therefore necessary that the driver is informed about the driving intention of the assistance system, and also about the object perception thereof, in appropriate traffic situations, in order to be able to intervene in corrective manner where appropriate.

Current assistance systems inform the driver of the vehicle about this by relevant information being displayed in an instrument cluster, in a head-up display and/or such like. In these systems, however, it is often not ensured that the perception by the driver of the information shown has been made apposite and intuitive. Consequently, an intuitive understanding of the system by the driver cannot be guaranteed in all traffic situations.

Printed publication DE 10 2020 106 380 A1 relates to a method for operating a driver-assistance system of a vehicle, with the following steps: detecting objects in an environment of the vehicle on the basis of ambient-field data, making available a display with displayed objects and with a displayed environment that describe the detected objects and/or the environment of the vehicle, executing a reaction of the driver-assistance system as a function of the objects shown and/or on the displayed environment, making available a user interface for changing the displayed objects and/or the displayed environment by an operator input, and adapting the reaction of the driver-assistance system as a function of the change of the displayed objects and/or of the displayed environment that occurred at the time of the operator input.

It is an object of the present subject matter to present a solution as to how a perception of the assistance-system information by a driver of a vehicle can be improved in the case of assistance-system information for promoting an understanding of the system.

In accordance with the present subject matter, this object is achieved by a method, by an assistance system, by a computer program and by a computer-readable storage medium.

A method according to the present subject matter serves for animated representation of at least one object perception and of a driving intention of an assistance system for at least partially automated maneuvering of a vehicle. The method may also serve for operating the assistance system. The method includes representing the at least one object perception by the assistance system, to the extent that an object, captured within the scope of the at least one object perception, in an environment of the vehicle influences a control strategy of the at least partially automated maneuvering by the assistance system. In addition, the method includes animating the at least one object perception, wherein the vehicle is represented by an avatar, and an interaction of the avatar with the captured object takes place within the scope of the animating. In this process, within the scope of the animating of the at least one object perception the avatar mimics at least one additional action if the captured object in the environment of the vehicle influences the control strategy. The method additionally includes representing the driving intention of the assistance system, which describes a plan of the control strategy influenced by reason of the captured object. Lastly, the representing of the driving intention of the assistance system takes place in animated manner, the driving intention being mimicked by the avatar within the scope of the animating for the purpose of improving an understanding of the system by a driver of the vehicle.

The concept of the "at least partially automated" driving or maneuvering encompasses automated driving with any degree of automation. Exemplary degrees of automation are assisted, partially automated, highly automated, fully automated and autonomous driving (with, in each instance, increasing degree of automation).

The concept of the object perception by an assistance system, as used in this document, designates the step of object capture and interpretation, and is often designated—for instance, in certain control paradigms pertaining to a robot—as the sense-step (such a step within the scope of the sense-plan-act paradigm is known from the technical language). With this in mind, the concept of the driving intention of an assistance system, as used in this document, is to be understood to mean an actual intention, or the actual objective of the action of the plan step.

The actual intention, or the actual objective of the action, can be attained in diverse ways. For instance, a reduction of a current driving speed of a vehicle can be attained by a reduction of the drive torque, and also by a braking intervention. In particular, several different interventions may be necessary in the course of realizing the driving intention. The concept of the influenced control strategy, as used in this document, is therefore to be understood to mean a changing driving intention of the assistance system by reason of an object perception.

With the aid of the method, an understanding of the system by the driver in respect of the assistance system for at least partially automated maneuvering of the vehicle can accordingly be improved. Within the scope of the method, at least one object perception and a driving intention of the assistance system can be represented in animated manner. If the assistance system captures, for instance with a camera, a road sign that describes the permissible maximum speed and if, by reason of this, a reduction of the current driving speed of the vehicle is required, the captured traffic sign influences the control strategy of the assistance system. The relevant information that serves for improving the understanding of the system in respect of the assistance system of the vehicle can thereupon be presented to the driver of the vehicle in animated manner. In this way, the driver can be intuitively informed at all times about the object perception of the assistance system and also about the driving intention thereof.

According to the case just described, the assistance system may be, for instance, an adaptive cruise control system with a detection of the currently permissible maximum speed. In this example, the captured object may be the road sign, in which case the traffic sign reproduced on the road sign describes the permissible maximum speed. Over and above this, however, further assistance systems or functions are also conceivable. In addition, the captured object may be any object in the environment of the vehicle—that is to say, for instance, another road-user, an obstacle, a road marking or such like.

In the course of the animated representation, the vehicle, or the ego vehicle, can be represented by an avatar. The avatar may be, for instance, a Chinese dragon, a riding cowboy, a dog sled or such like. If an object, such as a road sign for instance, is now captured in the environment of the vehicle within the scope of the at least one object perception, the captured object can be displayed together with the avatar that represents the vehicle. The representation of the object, or of the at least one object perception, can additionally take place in animated manner—that is to say, in temporally variable manner. By virtue of the animating—that is to say, by virtue of the displaying of a large number of individual images that suggest a moving image to the driver—an improvement of the understanding of the system can be achieved. Over and above this, the perceptibility of the displayed information by the driver can be enhanced.

It is to be emphasized that the avatar is able to interact with the captured object within the scope of the animating. Such an interacting may be—for instance, in the case of the Chinese dragon—a spitting of fire in the direction of the captured object. In the case of the riding cowboy, the interacting can be represented, for instance, in the form of a whirling lasso with which the captured object is ensnared.

In other words, the interacting of the avatar with the captured object within the scope of the animating accordingly mimics an additional action, the additional action being mimicked by the avatar only when the captured object in the environment of the vehicle influences the control strategy. In the aforementioned example with the road sign that limits the permissible maximum speed, the additional action can accordingly be mimicked when a reduction of the current driving speed of the vehicle is required or—to be more exact—when the current driving speed is greater than the permissible maximum speed.

Over and above this, within the scope of the animated representation the driving intention of the assistance system can also be represented. While the control strategy can be influenced in highly diverse ways, the driving intention of the assistance system can present the actual plan of the assistance system to the driver of the vehicle. In this connection, the representation of the driving intention can take place in animated manner and in this way contribute to an improvement of the driver's understanding of the system.

If, for instance, a traffic sign that allows a higher permissible maximum speed than the current driving speed of the vehicle is captured by the assistance system, the control strategy of the at least partially automated maneuvering by the assistance system can be influenced. If, within the scope of the animating, the vehicle is represented, for instance, as a riding cowboy, the at least one object perception of the traffic sign can be represented in animated manner in such a way that the traffic sign is ensnared by the riding cowboy with a lasso. As a result, it is firstly made clear to the driver of the vehicle that the object—in this case, the traffic sign—has been captured and the control strategy is being influenced thereby.

However, at this point in time the driver of the vehicle is not yet aware of the consequences of the influencing of the control strategy. The fact that this may result in a higher driving speed can be communicated to the driver by the animated representing of the driving intention of the assistance system. For instance, a horse belonging to the riding cowboy may in this connection scuff its hooves and—depending on the intended acceleration—gallop away more or less quickly.

In summary, using the method according to the present subject matter for animated representation of the at least one object perception and of the driving intention of the assistance system it can accordingly be ensured that the driver perceives relevant information pertaining to the assistance system better and, as a result, is given an improved understanding of the system. By virtue of the animated representation, the perception of the driver can be improved in comparison with a static representation.

In addition, it is advantageous if at least one animation parameter is determined as a function of the at least one object perception and/or as a function of the driving intention of the assistance system, in which case the at least one animation parameter influences the animating. For instance, the avatar of the vehicle may vary, depending on the captured object and/or depending on the driving intention. In addition, it is conceivable that the additional action that the avatar mimics within the scope of the animating of the at least one object perception depends on the object perception and/or on the driving intention of the assistance system. Furthermore, an animation parameter may also influence the speed of the animated representation.

The animation parameter can accordingly serve to ensure that the perception of information pertaining to the assistance system by the driver is additionally improved and that the understanding of the system is enhanced.

It is particularly advantageous if the at least one animation parameter describes at least an urgency of an implementation of the control strategy, and the animating takes place in a manner depending on the urgency. For instance, a considerable reduction of the current driving speed of the vehicle may be necessary by reason of another road-user cutting in ahead of the vehicle. The captured object—that is to say, in this example, the further road-user cutting in—can be captured by the assistance system within the scope of the object perception. The at least one animation parameter that describes at least an urgency of the implementation of the control strategy can be determined, for instance, by a period of time that describes the time up until the collision of the vehicle with the further road-user cutting in (also called the time-to-collision).

Over and above this, it is conceivable that the speed of animation, for instance, is influenced as a function of the at least one animation parameter, or of the urgency. In addition, it is conceivable that, depending on the urgency, the avatar mimics further actions within the scope of the animating of the at least one object perception. By virtue of the mimicking of further actions, the attention of the driver of the vehicle can be drawn to a currently critical situation, and the driver can intervene where appropriate.

Lastly, it is also advantageous if the animated representation takes place in such a manner that the at least one object perception, or the driving intention of the assistance system, is perceived by the driver substantially by peripheral vision. Peripheral vision is the perception in the regions of the field of vision of the driver that are not imaged onto the central retina. In the case of peripheral (or indirect) vision, the driver actually looks past the animated representation. Peripheral vision is very efficient for the perception of movements. On the one hand, the driver of the vehicle is accordingly not disturbed by the animated representation of the object perception and of the driving intention, and, on the other hand, by reason of the peripheral vision an efficient perception is ensured by reason of the animated representation—that is to say, the motion—of the avatar. A synergistic effect accordingly arises overall by reason of the animated representation in a region that is perceived by the driver of the vehicle by peripheral vision and that therefore lies outside his/her actual visual field, directed toward the road.

An assistance system according to the present subject matter for a vehicle includes a display device that has been set up to display at least one object perception and a driving intention of the assistance system in animated manner in accordance with a method according to the present subject matter. In addition, the assistance system may include at least one ambient-field sensor and also an electronic control unit or a computing device. The assistance system may have been set up, in particular, for at least partially automated maneuvering—that is to say, for instance, for partially automated longitudinal and/or lateral guidance.

A vehicle according to the present subject matter, in particular a passenger car, includes an assistance system according to the present subject matter.

A further aspect of the present subject matter relates to a computer program, comprising instructions that, upon execution of the program by a computing device, induce the latter to represent at least one object perception and a driving intention of an assistance system for at least partially automated maneuvering of a vehicle on a display device in animated manner in accordance with a method according to the present subject matter. Moreover, the present subject matter relates to a non-transitory computer-readable storage medium, comprising instructions that, upon execution of the program by a computing device, induce the latter to represent at least one object perception and a driving intention of an assistance system for at least partially automated maneuvering of a vehicle on a display device in animated manner in accordance with a method according to the present subject matter.

The display device may be, for instance, a monitor, part of an instrument cluster, a display, a head-up display or such like. The computing device includes, in particular, at least one processor. In addition, the computing device may exhibit a memory. The computing device may be constituted by at least one electronic control unit.

The preferred embodiments, and the advantages thereof, presented with reference to the method according to the present subject matter apply correspondingly to the assistance system according to the present subject matter, to the vehicle according to the present subject matter, to the computer program according to the present subject matter, and to the non-transitory computer-readable storage medium according to the present subject matter.

The features and combinations of features mentioned above in the description, as well as the features and combinations of features mentioned below in the description of the figures and/or shown on their own in the figures, are capable of being used not only in the respectively specified combination but also in other combinations or on their own without departing from the scope of the present subject matter.

DETAILED DESCRIPTION OF THE DRAWINGS

In the figures, identical or functionally identical elements are provided with the same reference symbols.

Figure 1:
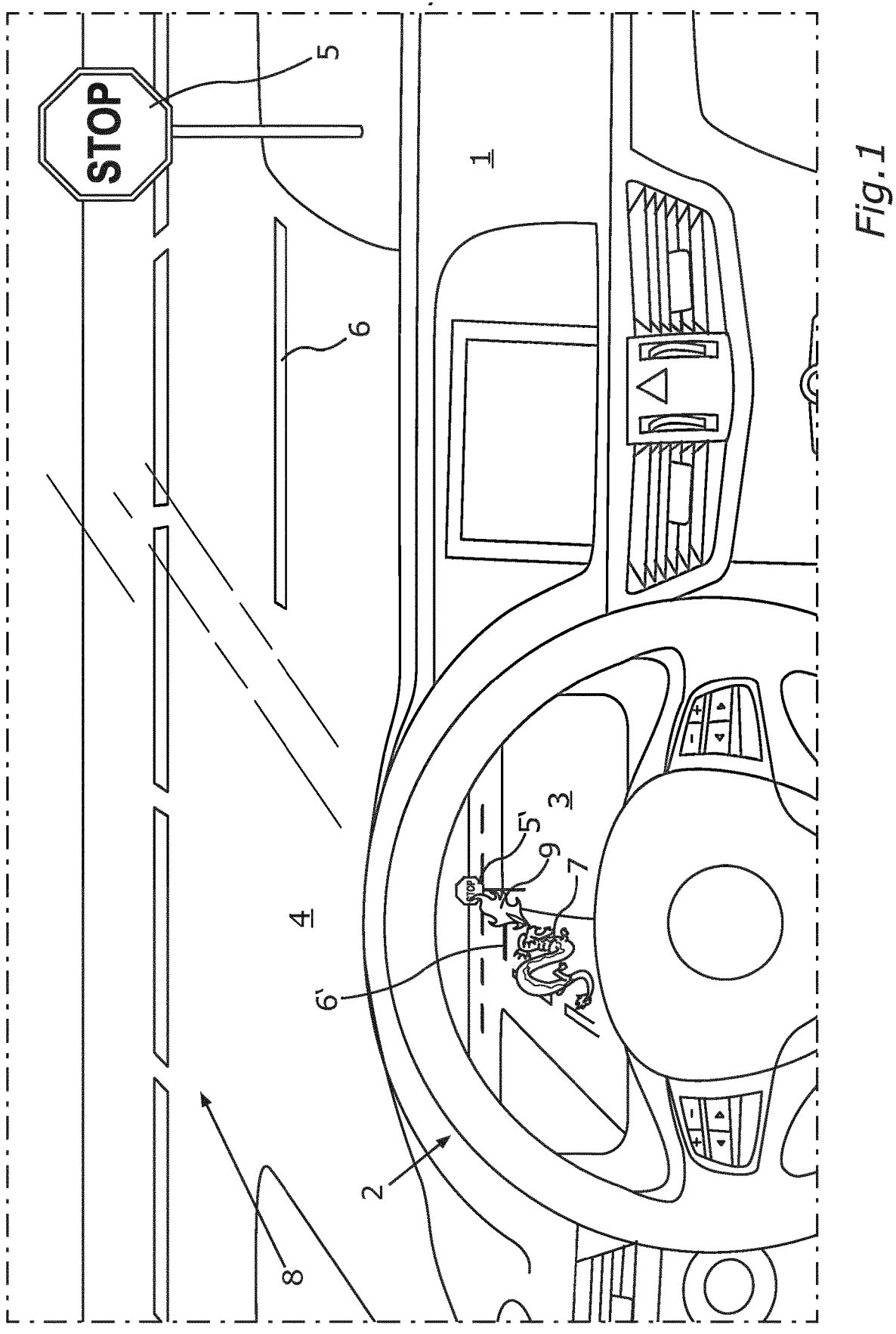
FIG. 1 shows a schematic representation of a display panel of a vehicle, the display panel including a display device on which an animated representation of an object perception is indicated.

FIG. 1 shows, in a schematic representation, a display panel 2 of a vehicle 1, the display panel 2 including a display device 3 on which an animated representation of an object perception of an assistance system of the vehicle 1 is indicated. Over and above this, an environment 4 of the vehicle 1 is represented from the viewpoint of a driver of the vehicle 1 who is looking through the windshield of the vehicle 1.

The assistance system may, for instance, take the form of an adaptive cruise control system with traffic-sign recognition, proximity control and/or such like. The display device 3 represents the object perception of the assistance system schematically. Within the scope of the object perception, the assistance system captures the stop-sign 5. The stop-sign 5 in the environment 4 of the vehicle 1 is represented in the display device 3 by the virtual stop-sign 5'. Moreover, the stopping-line 6 in the environment 4 of the vehicle 1 is represented in the display device 3 by the virtual stopping-line 6'. The vehicle 1 is represented by an avatar 7. In the example shown in FIG. 1, the avatar 7 has been represented as a Chinese dragon.

In the example shown in FIG. 1, the assistance system undertakes the longitudinal guidance of the vehicle 1. The vehicle 1 is traveling in the environment 4 toward an intersection 8. At the intersection 8, the priority is regulated by the stop-sign 5. The stop-sign 5 is captured by the assistance system within the scope of the object perception. However, at the moment of the capturing of the stop-sign 5 by the assistance system of the vehicle 1—that is to say, at the moment of object perception—the driver of the vehicle 1 is not necessarily aware that the stop-sign 5 is being captured correctly by the assistance system of the vehicle 1.

Under certain circumstances the driver is accordingly still less aware that the control strategy of the at least partially automated maneuvering by the assistance system—that is to say, in particular, the longitudinal control of the vehicle 1 by the assistance system—is being influenced. Accordingly, under certain circumstances the driver of the vehicle 1 is not cognizant that the stop-sign 5 has been captured and that the assistance system is thereupon changing the control strategy. In other words, under certain circumstances the driver is accordingly unaware that the assistance system of the vehicle 1 intends to stop at the stopping-line 6.

The fact that the stop-sign 5 is captured by the assistance system within the scope of the object perception can be made clear to the driver of the vehicle 1 within the scope of the animating of the at least one object perception by virtue of at least one additional action that the avatar—represented here by spitting of fire 9—mimics. Alternatively, the additional action that the avatar mimics may be a devouring of the virtual stop-sign 5'.

In summary, using the method according to the present subject matter for animated representation of the at least one object perception and of the driving intention of the assistance system it can accordingly be ensured that the driver perceives relevant information pertaining to the assistance system better, and as a result is given an improved understanding of the system.

Figure 2:
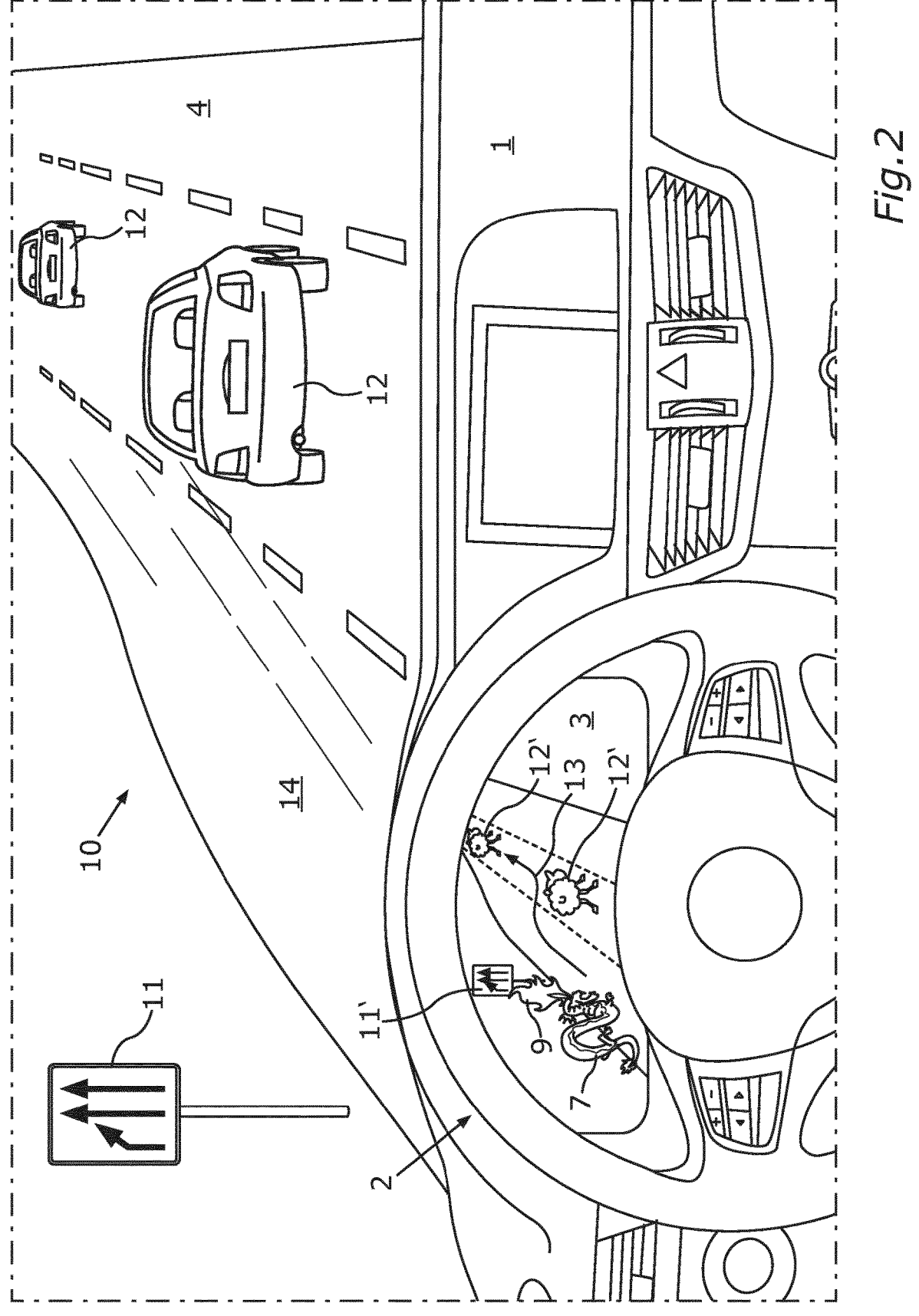
FIG. 2 shows a schematic representation of a display panel of a vehicle that includes a display device on which an animated representation of an object perception and of a driving intention is indicated.

FIG. 2 shows, in a schematic representation, a display panel 2 of a vehicle 1, the display panel 2 including a display device 3 on which an animated representation of an object perception and of a driving intention of an assistance system of the vehicle 1 is indicated. Over and above this, an environment 4 of the vehicle 1 is represented from the viewpoint of a driver of the vehicle 1 who is looking through the windshield of the vehicle 1.

The vehicle 1 is traveling in the environment 4 on a freeway 10 having a roadway that has three lanes. The vehicle 1 is traveling in the left lane 14 of the roadway. Over and above this, a "lane ends" panel 11 marks the end of the left lane 14.

Further road-users 12 are located in the middle lane. When the assistance system, which in this example controls at least a lateral and longitudinal guidance of the vehicle 1, has been activated, in the example represented here the driver of the vehicle 1 is not aware of whether the "lane ends" panel 11 and the end of the left lane 14 were captured correctly by the assistance system. This can be presented to the driver of the vehicle 1 by the display device 3.

In the example from FIG. 2, the further road-users 12 can be represented on the display device 3 by additional avatars 12' (in this example, represented as sheep). The "lane ends" panel 11 can be represented on the display device 3 by a virtual "lane ends" panel 11'. The capturing of the "lane ends" panel 11 by the assistance system can be made known to the driver once again by the mimicking of at least one additional action—represented here once again as spitting of fire 9—of the avatar 7.

However, under certain circumstances at this point in time the driver of the vehicle 1 is not aware of the consequences that arise for the control strategy, or the driving intention, of the assistance system by reason of the "lane ends" panel 11. In other words, it may accordingly be the case that the particular driving intention of the assistance system is not clear to the driver. Accordingly, the assistance system might, for instance, decelerate the vehicle 1 considerably in the left lane 14 and cut in behind the two further road-users 12. Similarly, it is possible that the assistance system has the driving intention to accelerate the vehicle 1, in order subsequently to cut in between the two further road-users 12.

In the example from FIG. 2, the driving intention of the assistance system consists in firstly accelerating the vehicle 1 and subsequently cutting in between the two further road-users 12. This is indicated in the representation by the trajectory 13. Within the scope of the animated representing of the driving intention of the assistance system, the avatar

7 (indicated here in exemplary manner as a Chinese dragon) is able to move along the trajectory 13 and in this way to make the driving intention of the assistance system clear to the driver of the vehicle.

An animation parameter can, for instance, be determined as a function of how strongly the vehicle 1 has to be accelerated in order to cut in between the two further road-users 12. Such an animation parameter can describe at least an urgency of an implementation of the control strategy—that is to say, for instance, of the accelerating—and can influence a speed of animation. As a result, an urgency can be signaled to the driver of the vehicle 1.

Figure 3:
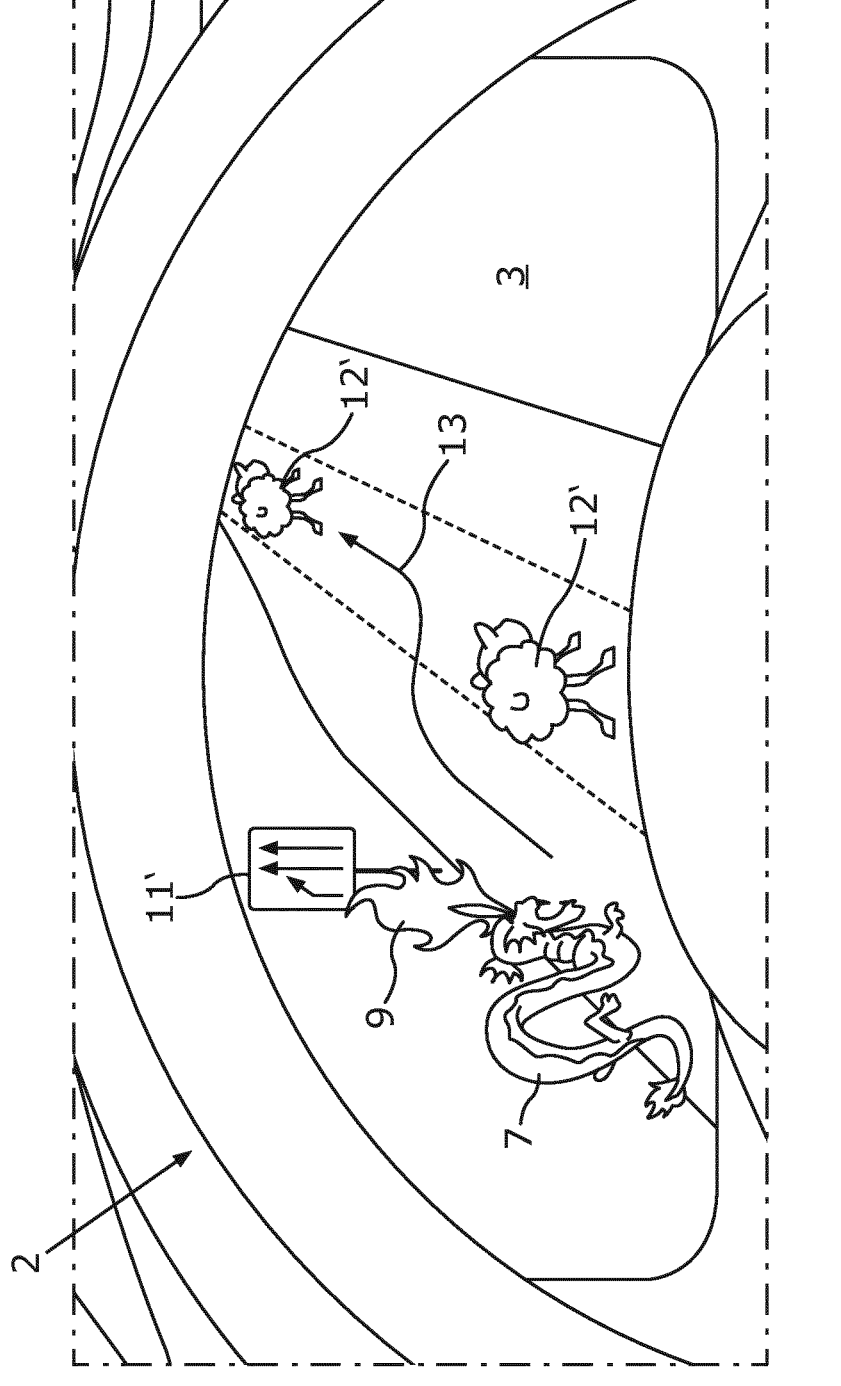
FIG. 3 shows a schematic representation of the display device according to FIG. 2, in enlarged form.

FIG. 3 shows, in a schematic representation, the display device according to the traffic situation shown in FIG. 2, in enlarged form.

The invention claimed is:

1. A method for representing at least one object perception and a driving intention of an assistance system for at least partially automated maneuvering of a vehicle, comprising:
perceiving an object within an environment of the vehicle using the assistance system, wherein;
the perceived object influences a control strategy of the at least partially automated maneuvering of the assistance system;
representing the perceived object as an animated representation;
representing the vehicle by an avatar;
displaying a first animation of an interaction between the avatar and the perceived object, wherein:
the avatar is animated to mimic performing a first action associated with the avatar based on perceiving, by the assistance system, the perceived object; and
displaying a second animation representing the driving intention of the assistance system, wherein:
the avatar is animated to mimic performing, within the second animation, a second action associated with the avatar directly on the animated representation of the perceived object based on a plan of the control strategy being influenced by the perceived object, wherein the second animation conveys the plan of the assistance system to a driver of the vehicle.

2. The method according to claim 1, wherein;
an animation parameter is determined as a function of the perceived object and/or as a function of the driving intention of the assistance system, and
the animation parameter influences the first and/or second animation.

3. The method according to claim 2, wherein:
the animation parameter describes an urgency of an implementation of the control strategy, and
the first and/or second animation occurs as a function of the urgency.

4. The method of claim 3, wherein:
the animation parameter corresponds to a speed of the first and/or second animation; and
the first and/or second animation occurs as the function of the urgency based on influencing the speed of the first and/or second animation.

5. The method according to claim 1, wherein;
the first and/or second animation occurs such that the perceived object or the driving intention of the assistance system is displayed within peripheral vision of the driver of the vehicle.

6. The method of claim 1, wherein:
the avatar comprises a non-motor vehicle representation of the vehicle.

7. The method of claim 1, wherein:

based on the avatar comprising a dragon, the first action comprises the avatar spitting fire in a direction of the animated representation within the first animation and the second action comprises the avatar devouring the animated representation within the second animation; or based on the avatar comprising a riding cowboy, the first action comprises the avatar whirling a lasso within the first animation and the second action comprises the avatar ensnaring the animated representation with the lasso within the second animation.

8. The method of claim 1, wherein:

the avatar representing the vehicle varies based on the perceived object and/or the driving intention of the assistance system.

9. An assistance system for a vehicle, comprising:

a display configured to represent the perceived object and the driving intention of the assistance system in an animated manner in accordance with a method according to claim 1.

10. A non-transitory computer-readable medium comprising instructions operable, when executed by one or more computing systems, to:

perceive an object within an environment of a vehicle using an assistance system, wherein;

the perceived object influences a control strategy of an at least partially automated maneuvering of the assistance system;

represent the perceived object as an animated representation;

represent the vehicle by an avatar;

display a first animation of an interaction between the avatar and the perceived object, wherein:

the avatar is animated to mimic performing a first action associated with the avatar based on perceiving, by the assistance system, the perceived object; and display a second animation representing a driving intention of the assistance system, wherein:

the avatar is animated to mimic performing, within the second animation, a second action associated with the avatar directly on the animated representation of the perceived object based on a plan of the control strategy being influenced by the perceived object, wherein the second animation conveys the plan of the assistance system to a driver of the vehicle.

* * * * *